(12) United States Patent
Craig et al.

(10) Patent No.: US 12,103,148 B1
(45) Date of Patent: Oct. 1, 2024

(54) AFT INNER CAP PLATE REMOVAL METHOD AND TOOLING FOR A COMBUSTOR WITH MICROMIXER TUBES

(71) Applicant: GE Infrastructure Technology LLC, Greenville, SC (US)

(72) Inventors: Tiffany M. Craig, Greenville, SC (US); Jesse Barton, Greenville, SC (US); Keith C. Belsom, Greenville, SC (US); Martin Brown, Greenville, SC (US); Mark Steadman, Greenville, SC (US)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 18/479,218

(22) Filed: Oct. 2, 2023

(51) Int. Cl.
| | |
|---|---|
| B25B 27/14 | (2006.01) |
| B25B 27/02 | (2006.01) |
| B25B 27/16 | (2006.01) |
| F23R 3/42 | (2006.01) |

(52) U.S. Cl.
CPC ........... B25B 27/14 (2013.01); B25B 27/023 (2013.01); B25B 27/16 (2013.01); F23R 3/42 (2013.01)

(58) Field of Classification Search
CPC ....... B25B 27/14; B25B 27/023; B25B 27/16; F23R 3/42
See application file for complete search history.

(56) References Cited

U.S. PATENT DOCUMENTS

| | | | | |
|---|---|---|---|---|
| 1,492,877 | A | * | 5/1924 | Davis .................... B25B 27/023 29/262 |
| 2,290,427 | A | * | 7/1942 | Harrington ........... B25B 27/062 29/265 |
| 3,535,765 | A | * | 10/1970 | Denehie .................. B25B 27/24 29/888.42 |
| 4,009,515 | A | * | 3/1977 | Racin .................... B25B 27/023 29/280 |
| 5,255,435 | A | * | 10/1993 | Shultz .................... B25B 27/023 29/259 |
| 5,379,503 | A | * | 1/1995 | Fakult .................... B25B 27/062 29/265 |
| 9,259,807 | B2 | | 2/2016 | Means et al. |
| 9,302,380 | B2 | * | 4/2016 | Weaver ................. B25B 27/023 |
| 9,400,112 | B2 | | 7/2016 | Bellino et al. |
| 9,423,134 | B2 | | 8/2016 | Woods et al. |
| 9,423,136 | B2 | | 8/2016 | Bellino et al. |
| 9,528,703 | B2 | | 12/2016 | Willis et al. |
| 9,562,687 | B2 | | 2/2017 | Johnson et al. |

(Continued)

Primary Examiner — Seahee Hong
(74) Attorney, Agent, or Firm — Eversheds Sutherland (US) LLP (57) ABSTRACT

The present application provides an aft plate removal tool for servicing a combustor. The combustor includes an aft plate with a central passage and a number of tubes extending through the aft plate. The aft plate removal tool includes a central screw, a lower housing attached to the central screw, the lower housing including a number of spring loaded lower housing feet, and an upper housing attached to the center screw, the upper housing including a number of spring loaded upper housing feet. The aft plate removal tool is inserted through the central passage of the aft plate such that rotation of the upper housing advances the spring loaded upper housing feet against the aft plate until the spring loaded upper housing feet push the aft plate off of the tubes.

8 Claims, 9 Drawing Sheets

(56) References Cited

U.S. PATENT DOCUMENTS

| | | | |
|---|---|---|---|
| 9,579,779 B1 * | 2/2017 | Hunter | B25B 27/06 |
| 9,664,392 B2 | 5/2017 | Bellino et al. | |
| 2011/0173814 A1 * | 7/2011 | Patel | F04B 53/1087 |
| | | | 29/890.121 |
| 2015/0167983 A1 | 6/2015 | McConnaughhay et al. | |
| 2018/0087457 A1 | 3/2018 | Barton et al. | |
| 2019/0056112 A1 | 2/2019 | Nataranjan et al. | |

* cited by examiner

AFT INNER CAP PLATE REMOVAL METHOD AND TOOLING FOR A COMBUSTOR WITH MICROMIXER TUBES

TECHNICAL FIELD

The present application and the resultant patent relate generally to gas turbine engines and more particularly relate to improved methods and tooling to remove safely an aft inner cap plate from a micromixer headend of a combustor during repair and replacement.

BACKGROUND

A gas turbine engine conventionally includes a compressor for compressing ambient air and a number of combustors for mixing the flow of air with a flow of fuel to generate hot combustion gases. A turbine receives the flow of hot combustion gases and extracts energy therefrom for powering the compressor and for producing output power for an external load such as an electrical generator and the like. The combustors may be annularly arranged between the compressor and the turbine.

The combustors may include one or more bundled tube fuel injectors that extend downstream from an end cover. The bundled tube fuel injectors generally include a number of pre-mix or micromixer tubes. The micromixer tubes extend generally parallel to one another through the bundled tube fuel injector. An outer shroud extends circumferentially around the micromixer tubes and an aft plate extends radially and circumferentially across a downstream end thereof adjacent to a combustion chamber or zone defined within the combustor. A tube tip portion of each micromixer tube extends through the aft plate such that an outlet of each tube is downstream from a hot side surface of the aft plate, thus providing for fluid communication into the combustion chamber or zone.

Each of the micromixer tubes extends generally axially through a fuel plenum and a cooling air plenum. Compressed air is routed through inlets of each of the micromixer tubes upstream from the fuel plenum. Fuel is injected into the micromixer tubes through one or more fuel ports defined within each of the tubes. The fuel and compressed air mix inside the micromixer tubes before flowing out of the outlet of each of the tubes and into the combustion chamber or zone for combustion.

During operation of the combustor, the downstream or end portion of each micromixer tubes is exposed to extreme temperatures due to the proximity to the combustion chamber and/or the combustion flame. Likewise, the aft plate through which the micromixer tubes extend also may deform or dish due to the harsh conditions. Over time, various factors including thermal stress, mechanical fatigue, and combustion dynamics or vibrations may adversely affect the operating condition of the bundled tube fuel injectors, thus requiring scheduled inspection and in some cases repair or refurbishment of the components therein. Specifically, the dishing of the aft plate and the close fit may cause the micromixer tubes that run through the aft plate to bind. Removing the aft plate by moving it to the right, however, may damage the fuel injectors.

SUMMARY

The present application and the resultant patent thus provide an aft plate removal tool for servicing a combustor. The combustor includes an aft plate with a central passage and a number of tubes extending through the aft plate. The aft plate removal tool includes a central screw, a lower housing attached to the central screw, the lower housing including a number of spring loaded lower housing feet, and an upper housing attached to the center screw, the upper housing including a number of spring loaded upper housing feet. The aft plate removal tool is inserted through the central passage of the aft plate such that rotation of the upper housing advances the spring loaded upper housing feet against the aft plate until the spring loaded upper housing feet push the aft plate off of the tubes.

The present application and the resultant patent further provide a method of removing an aft plate from a number of tubes of a combustor. The method may include the steps of inserting an aft plate removal tool through the aft plate, releasing a number of feet of the aft plate removal tool, rotating an upper housing of the aft plate removal tool to advance a number of the feet into contact with the aft plate, rotating further the upper housing to deform the aft plate, and rotating further the upper housing to push the aft plate off of the tubes.

These and other features and improvements of this application and the resultant patent will become apparent to one of ordinary skill in the art upon review of the following detailed description when taken in conjunction with the several drawings and the appended claims.

DETAILED DESCRIPTION

Figure 1:
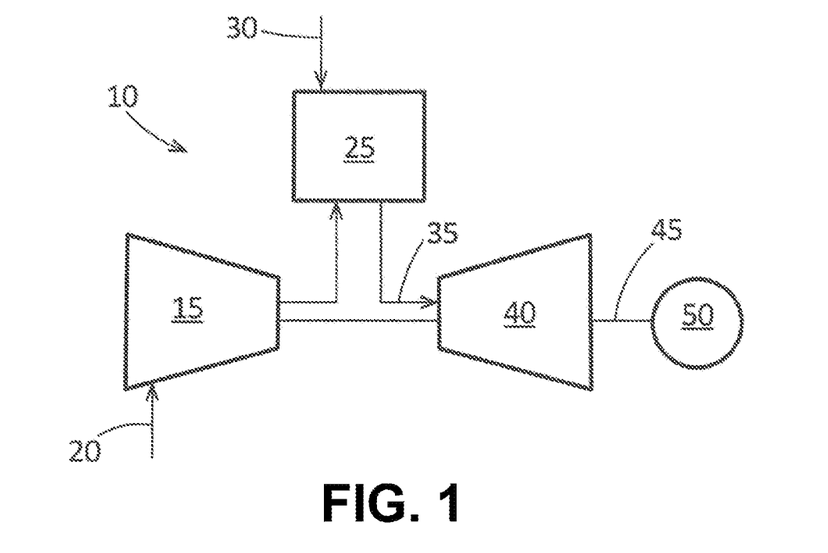
FIG. 1 is a schematic diagram of a gas turbine engine including a compressor, a combustor, a turbine, and an external load.

Referring now to the drawings, in which like numerals refer to like elements throughout the several views, FIG. 1 shows a schematic diagram of a gas turbine engine 10 as may be described herein. The gas turbine engine 10 may include a compressor 15. The compressor 15 compresses an incoming flow of air 20. The compressor 15 delivers the compressed flow of air 20 to a number of combustor cans 25. The combustor cans 25 mix the compressed flow of air 20 with a pressurized flow of fuel 30 and ignite the mixture to create a flow of hot combustion gases 35. Although only a single combustor can 25 is shown, the gas turbine engine 10 may include any number of combustor cans 25 positioned in a circumferential array and the like. Alternatively, the combustor 25 may be an annular combustor. The flow of combustion gases 35 is in turn delivered to a turbine 40. The flow of combustion gases 35 drives the turbine 40 to produce mechanical work. The mechanical work produced in the turbine 40 drives the compressor 15 via a rotor shaft 45. The turbine 40 and the rotor shaft 45 also may drive an external load 50 such as an electrical generator and the like.

The gas turbine engine 10 may use natural gas, various types of syngas, liquid fuels, and/or other types of fuels and blends thereof. The gas turbine engine 10 may be any one of a number of different gas turbine engines offered by General Electric Company of Schenectady, New York, including, but not limited to, those such as a 7-series or a 9-series heavy duty gas turbine engine and the like. The gas turbine engine 10 may be part of a simple cycle or a combined cycle power generation system or other types of generation systems. The gas turbine engine 10 may have different configurations and may use other types of components. Other types of gas turbine engines also may be used herein. Multiple gas turbine engines, other types of turbines, and other types of power generation equipment also may be used herein together.

Figure 2:
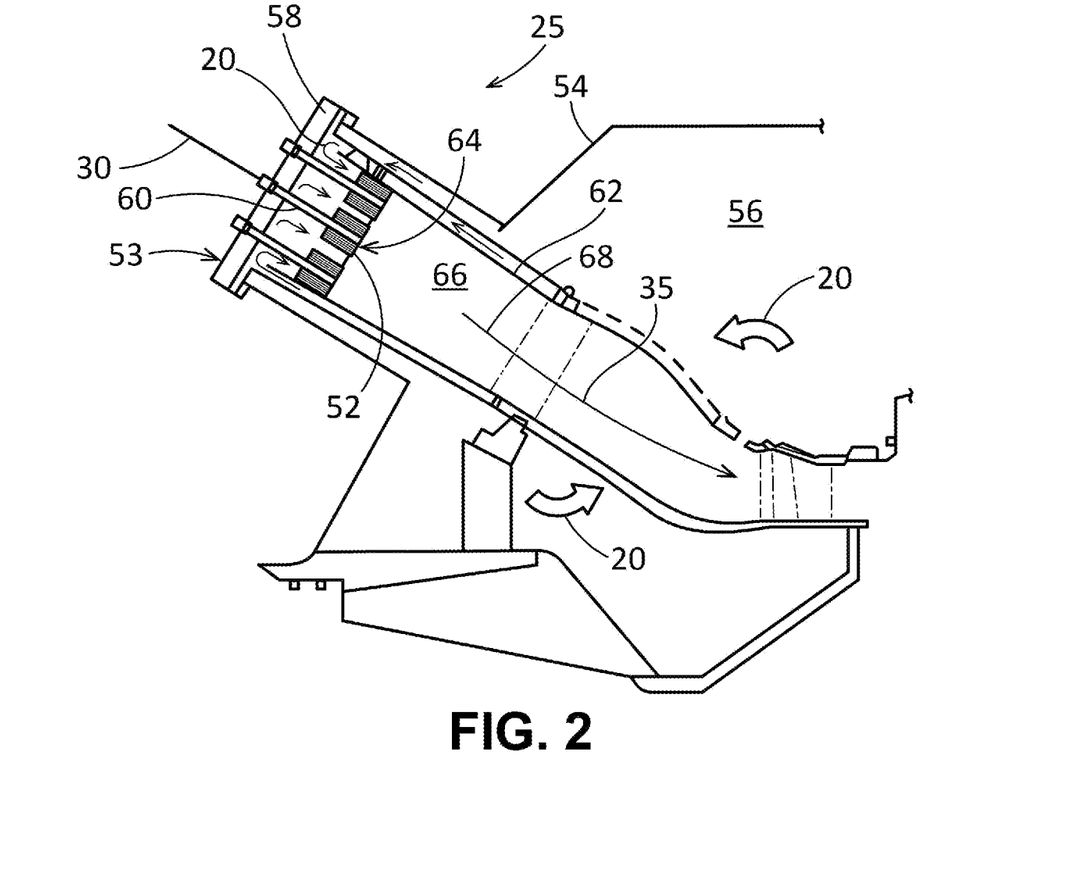
FIG. 2 is a schematic diagram of a combustor that may be used with the gas turbine engine of FIG. 1.

FIG. 2 is a partial sectional view of the combustor 25. The combustor 25 may incorporate a number of fuel injectors 52 therein. The fuel nozzles 52 may be combined in a fuel nozzle assembly 53. In this example, the fuel injectors 52 may be bundled tube fuel injectors and the like. The combustor 25 is at least partially surrounded by an outer casing 54. The outer casing 54 forms a high pressure plenum 56 around the combustor 25. The high pressure plenum 56 may be in fluid communication with the compressor 15 or other source for supplying the flow of air 20 to the combustor 25. An end cover 58 is coupled to the outer casing 54. The end cover 58 may be in fluid communication with the flow of fuel 30.

The fuel injectors 52 extend downstream from the end cover 58. The fuel injector 52 may be fluidly connected to the end cover 58 so as to receive the flow of fuel 30. For example, a fluid conduit 60 may provide for fluid communication between the end cover 58 and the fuel injector 52. One end of an annular liner 62 such as a combustion liner and/or a transition duct surrounds a downstream end 64 of the fuel injector 52 so as to at least partially define a combustion chamber 66. The liner 62 defines a hot gas path 68 for directing the combustion gases 35 from the combustion chamber 66.

In operation, the flow of air 20 is routed towards the end cover 58 where it reverses direction and flows through one or more of the fuel injectors 52. The flow of fuel 30 is provided to the fuel injector 52 and the flow of fuel 30 and the flow of air 20 are premixed or combined within the fuel injector 52 before being injected into a combustion chamber 66 for combustion.

Figure 3:
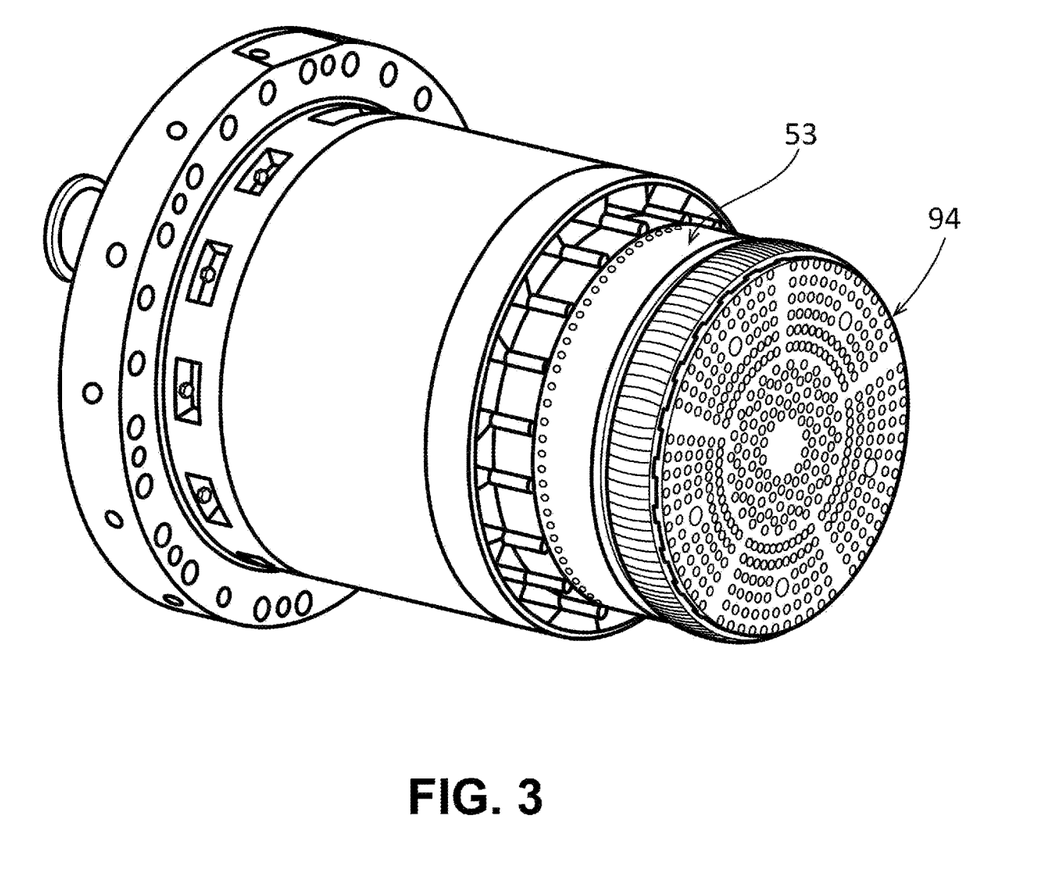
FIG. 3 is a perspective view of a fuel nozzle assembly of the combustor of FIG. 2.
Figure 4:
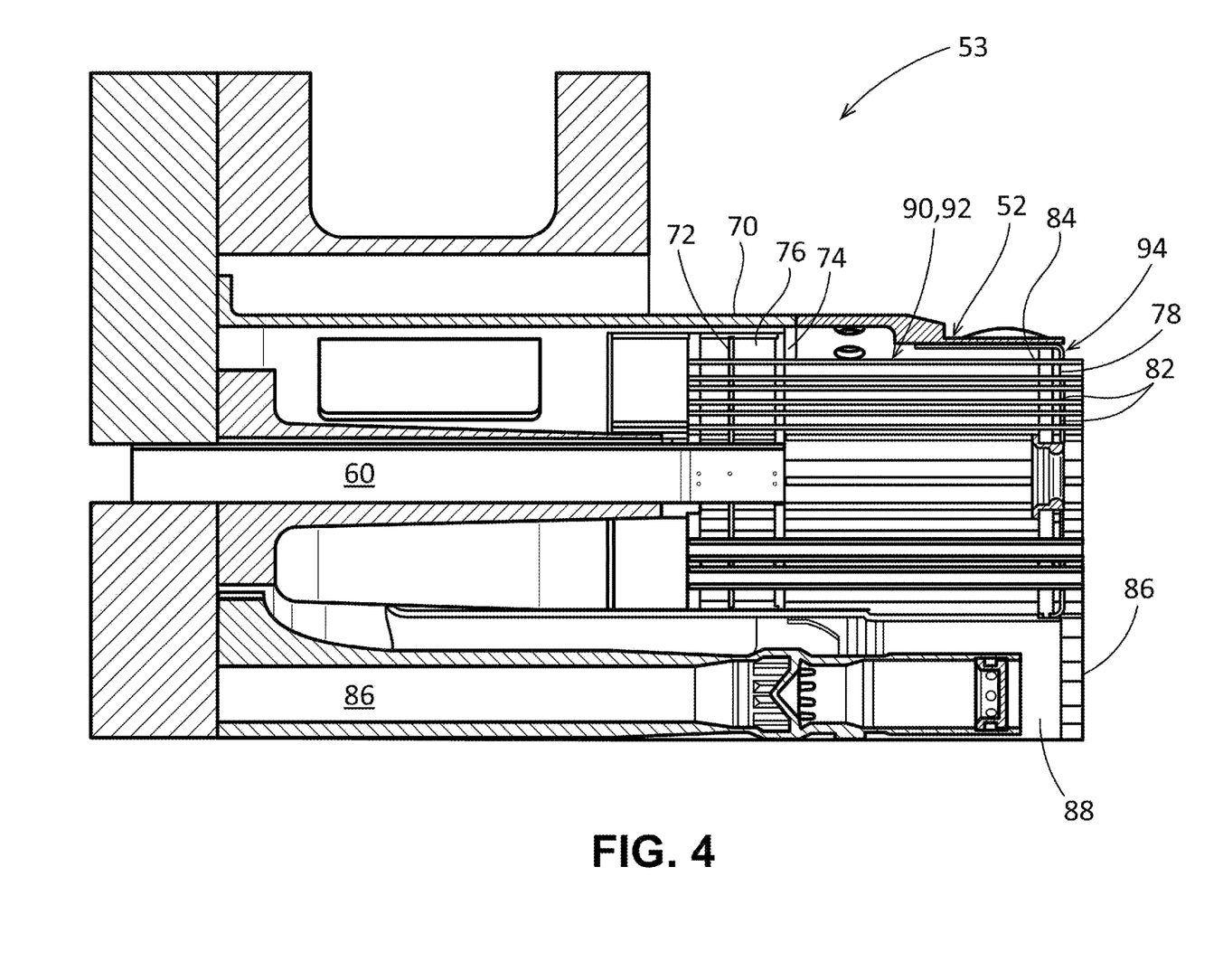
FIG. 4 is a schematic diagram of a fuel injector that may be used with the combustor of FIG. 2.

FIG. 3 is a perspective view of the fuel injector assembly 53 while FIG. 4 is a sectional view of an example of the fuel injector 52 described above. The fuel injector 52 generally includes a fuel distribution module 70 that is in fluid communication with the fluid conduit 60. The fuel distribution module 70 includes an upstream plate 72 that is axially separated from a downstream plate 74. A fuel plenum 76 may be defined between the upstream and downstream plates 72, 74. The fluid conduit 60 provides for the flow of fuel 30 to the fuel plenum 76.

An aft plate 78 is disposed at a downstream or aft end of the fuel injector 52. The aft plate 78 extends radially outwardly and circumferentially across the aft end with respect to an axial centerline. The aft plate 78 at least partially defines a number of tube tip passages 82 that extend generally axially therethrough. An impingement plate 84 is disposed upstream from the aft plate 78. The impingement plate 84 may be welded, brazed or otherwise coupled to the aft plate 78. The aft plate 78 and/or the impingement plate 84 may at least partially define a center passage 86 that extends generally axially therethrough. A fluid cartridge insert 88 may be coupled to the aft plate 78 at the center passage 86. The aft plate 78, the impingement plate 84, and the related components herein may be described as an inner cap assembly 94.

Figure 5:
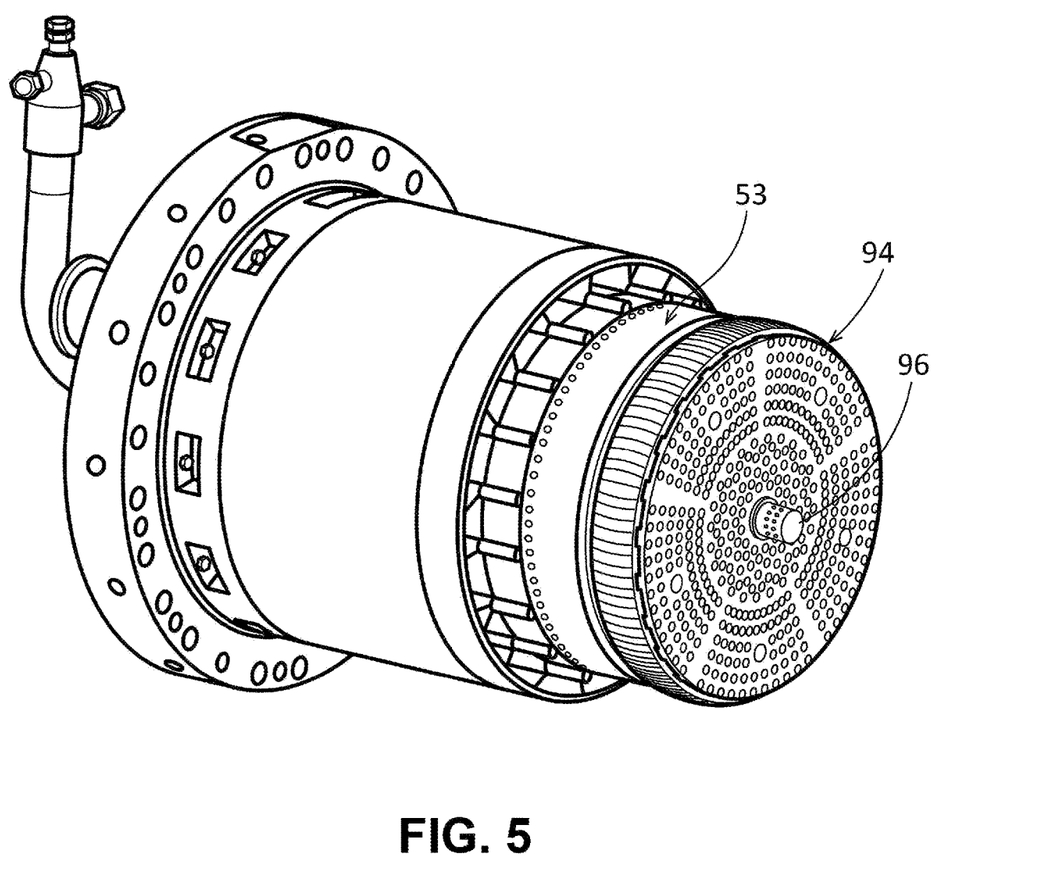
FIG. 5 is a perspective view of an alternative embodiment of a fuel nozzle assembly that may be used with the combustor of FIG. 2

The fuel injector 52 includes a micromixer tube bundle 90. The micromixer tube bundle 90 includes a number of micromixer (or pre-mixer) tubes 92 that extend generally parallel to one another along or parallel to the axial centerline of the fuel injector 52. The micromixer tubes 92 extend downstream from the fuel plenum 76 towards the aft plate 78 and/or the combustion chamber 66. A portion of the micromixer tubes 92 extends through the aft plate 78. Each micromixer tube 92 is generally aligned with the corresponding tube tip passage 82. The micromixer tubes 92 may be arranged in a number of rows or otherwise. Similarly, FIG. 5 shows an alternative embodiment of a fuel nozzle assembly 53 with the addition of a central liquid fuel nozzle 96.

Figure 6:
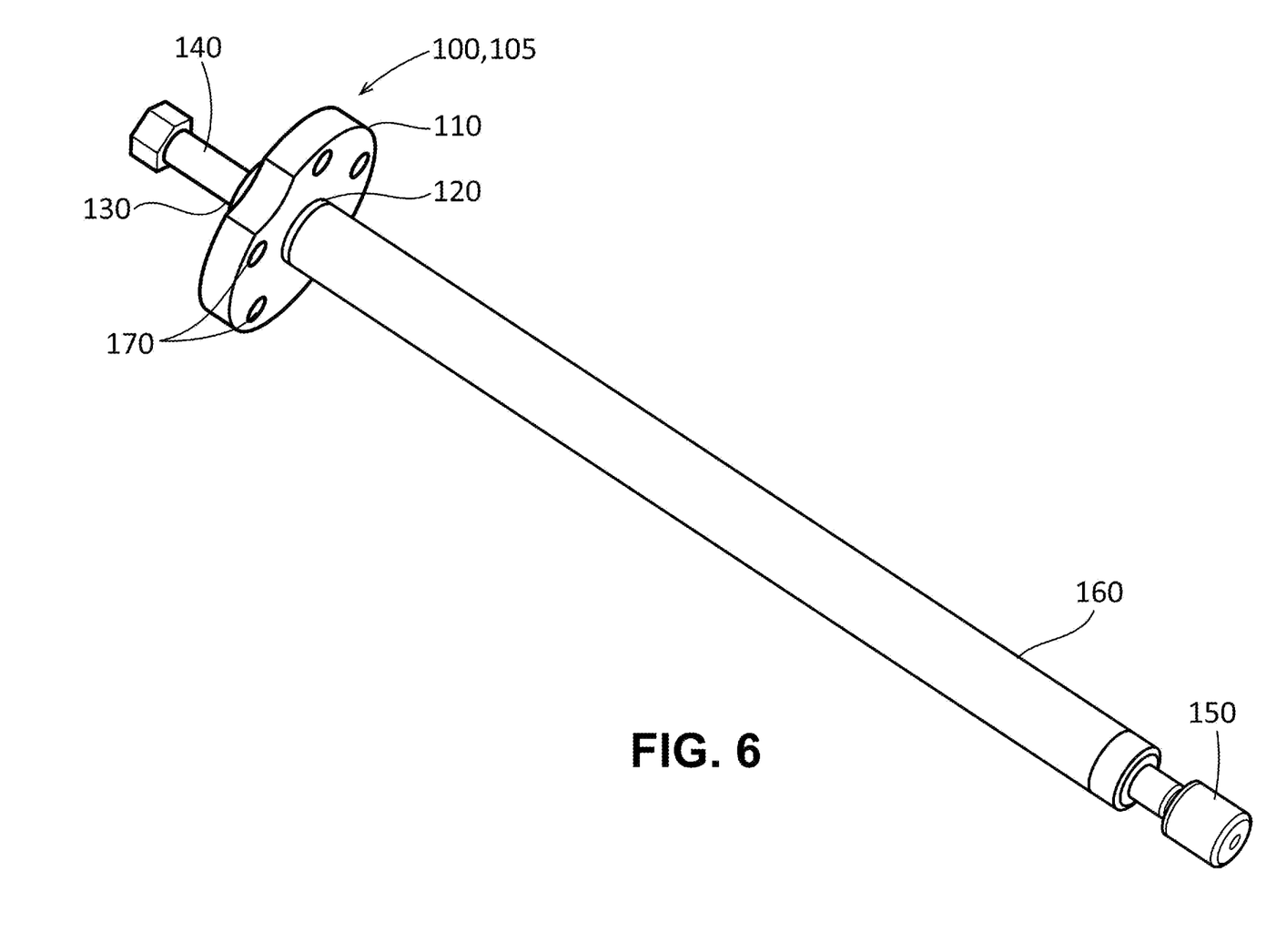
FIG. 6 is a perspective view of an example of an aft plate removal tool as may be described herein.

FIG. 6 shows an aft plate removal tool 100 as may be described herein. In this example, an inner aft plate removal tool 105 is shown. As the name implies, the inner aft plate removal tool 105 is used within the combustor 25 to remove the aft plate 78 and the inner cap assembly 94. Specifically, the inner aft plate removal tool 105 may be used to recontour and remove the aft plate 78 without damaging any of the micromixer tubes 92. The inner aft plate removal tool 105 may be used with the fuel nozzle assembly 53 of FIG. 3.

The inner aft plate removal tool 105 may include a base plate 110 with a base plate aperture 120, a threaded insert 130 positioned within the base plate aperture 120, and a threaded rod 140 extending through the threaded insert 130. The thread rod 140 may have a replaceable tip 150 on an aft end thereof. The replaceable tip 150 may be made out of Delrin (polyoxymethylene) or similar materials to protect against wear due to frictional contact with the aft plate 78. The threaded rod 140 also may have an outer sleeve 160 to protect the adjacent micromixer tubes 92. The threaded rod 140 may have any convenient length and other dimensions. The base plate 110 may have a number of attachment apertures 170 therein. A number of mounting bolts 180 and the like may be used to attach the inner aft plate removal tool 105 to the end cover 58 of the combustor 25. Other components and other configurations may be used herein.

Figure 7:
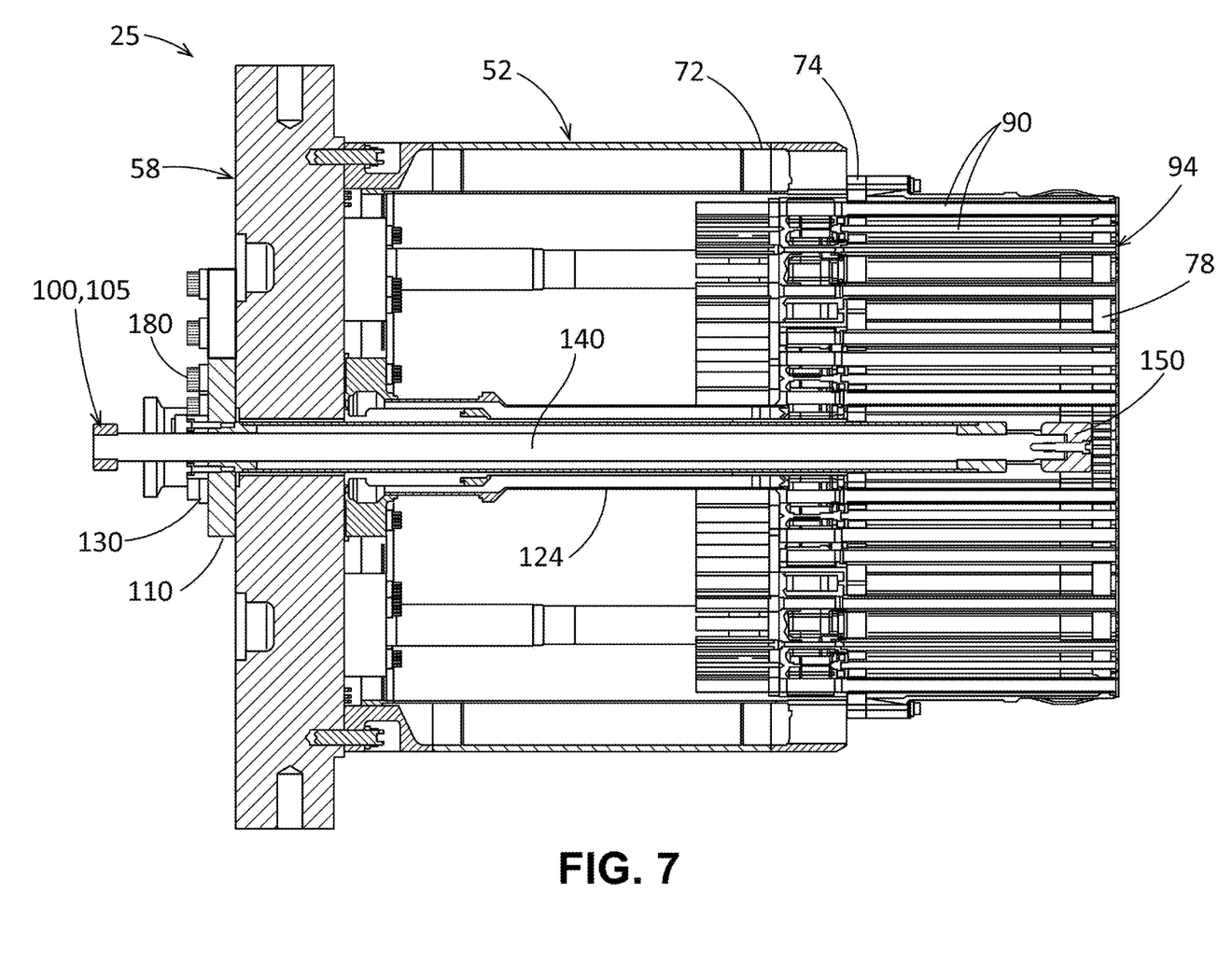
FIG. 7 is a partial sectional view of a combustor with the aft plate removal tool of FIG. 6 installed therein.
Figure 8:
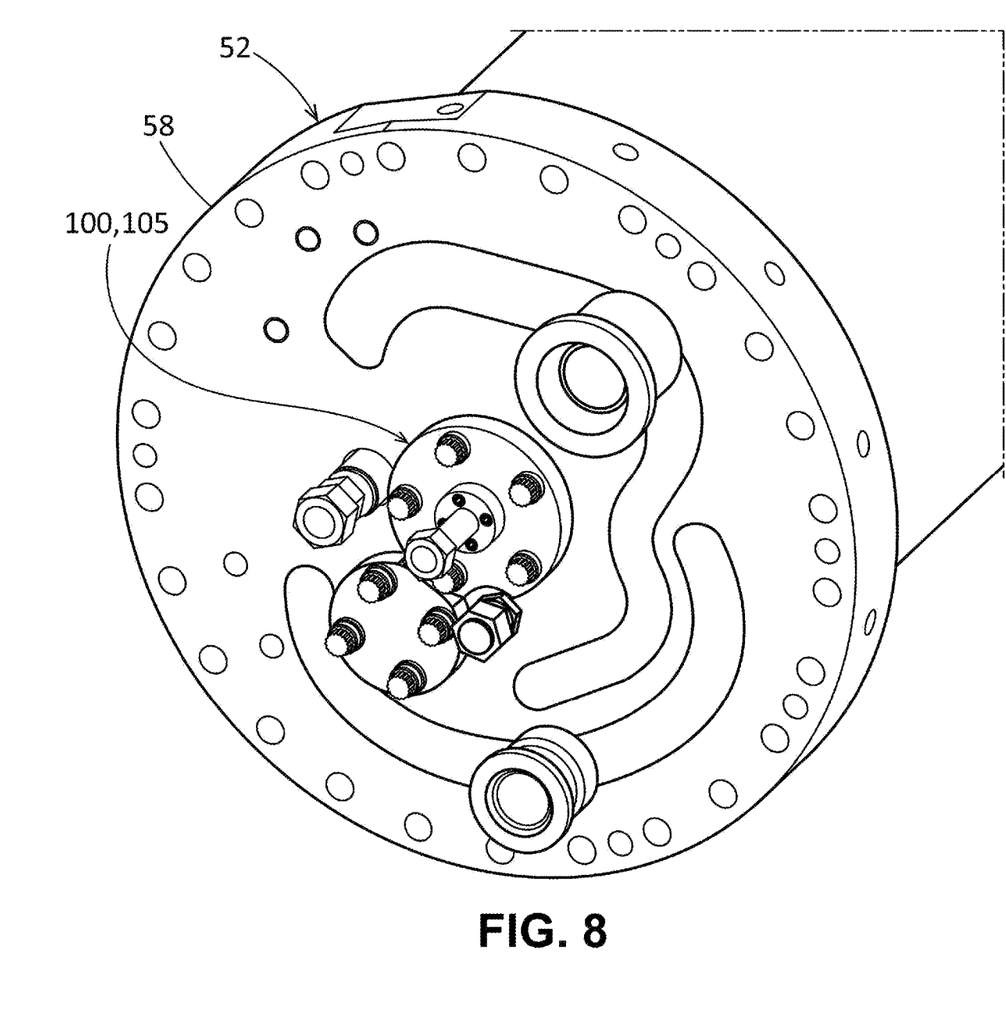
FIG. 8 is a partial perspective view of an end plate of a combustor with the aft plate removal tool installed therein.

FIGS. 7 and 8 show the inner aft plate removal tool 105 in use. The inner aft plate removal tool 105 may be inserted within the central passage 86 of the combustor 25. The inner aft plate removal tool 105 may be advanced therein until the replaceable tip 150 contacts the aft plate 78. The base plate 110 may be attached to the end cover 48 by attaching the mounting bolts 180. Once firmly secured in place, the threaded rod 140 may be rotated to advance. Specifically, the threaded rod 140 is rotated within the threaded insert 130 of the base plate 110.

As the threaded rod 140 advances in contact with the aft plate 78, the threaded rod 140 flattens any deformation in the aft plate 78. As the aft plate 78 flattens, the aft plate 78 and the inner cap assembly 94 begin to separate from the micromixer tubes 92. The threaded rod 140 continues to advance until the aft plate 78 and the inner cap assembly 94 is completely pushed off of the micromixer tubes 92. The advance of the threaded rod 140 thus allows the aft plate 78 and the inner cap assembly 94 to slide freely off of the micromixer tubes 92 without any damage thereto. The threaded rod 140 them may be rotated in the opposite direction and the inner aft plate removal tool 105 may be unattached from the end cover 58. The inner aft plate removal tool 105 may be withdrawn from the combustor 25.

Figure 9:
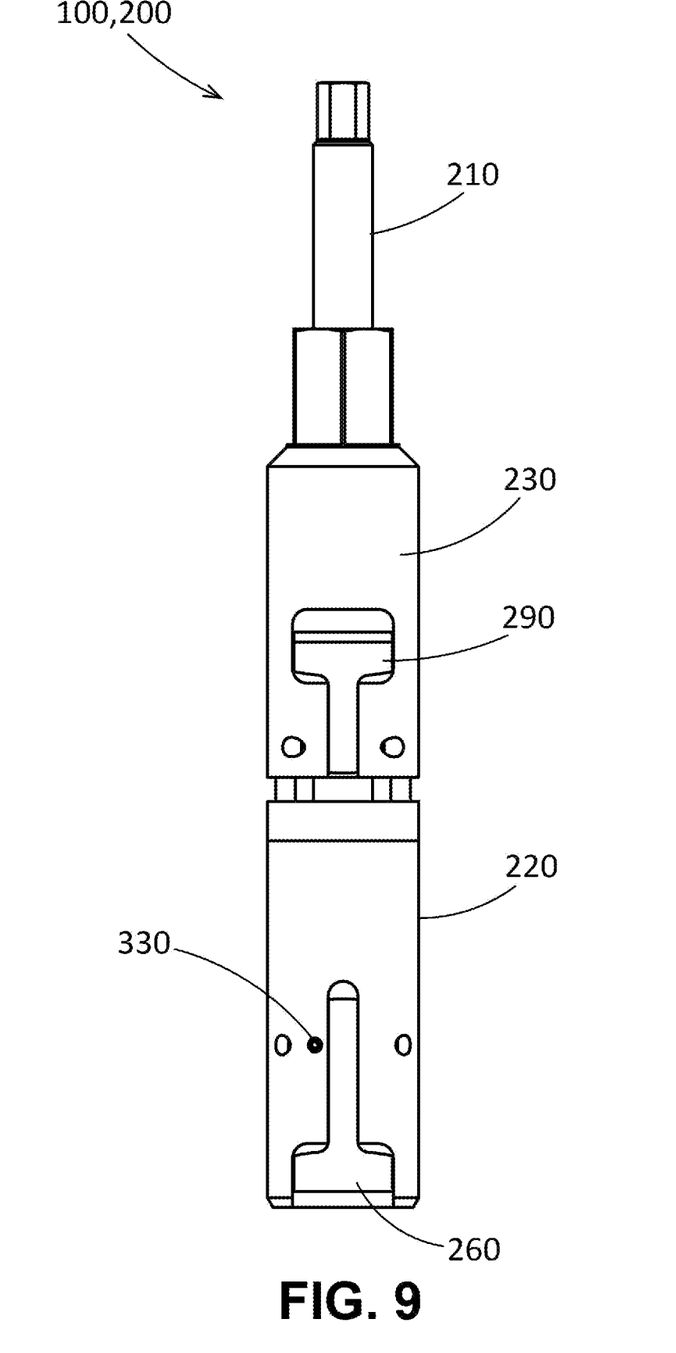
FIG. 9 is a plan view of an alternative embodiment of an aft plate removal tool as may be described herein.
Figure 10:
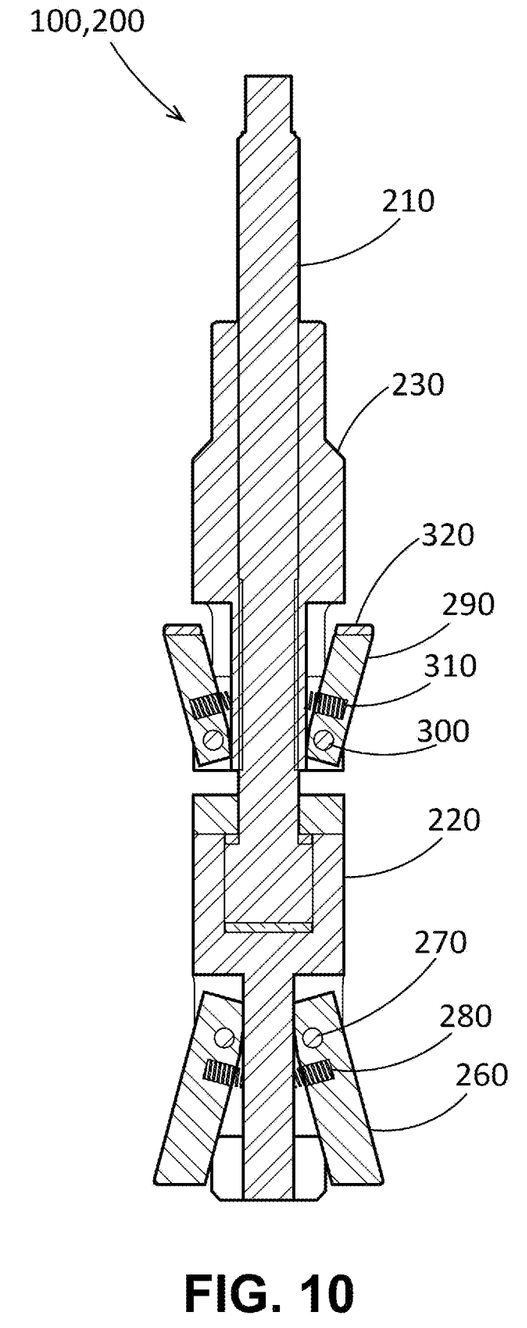
FIG. 10 is a sectional view of the aft plate removal tool of FIG. 9.
Figure 11:
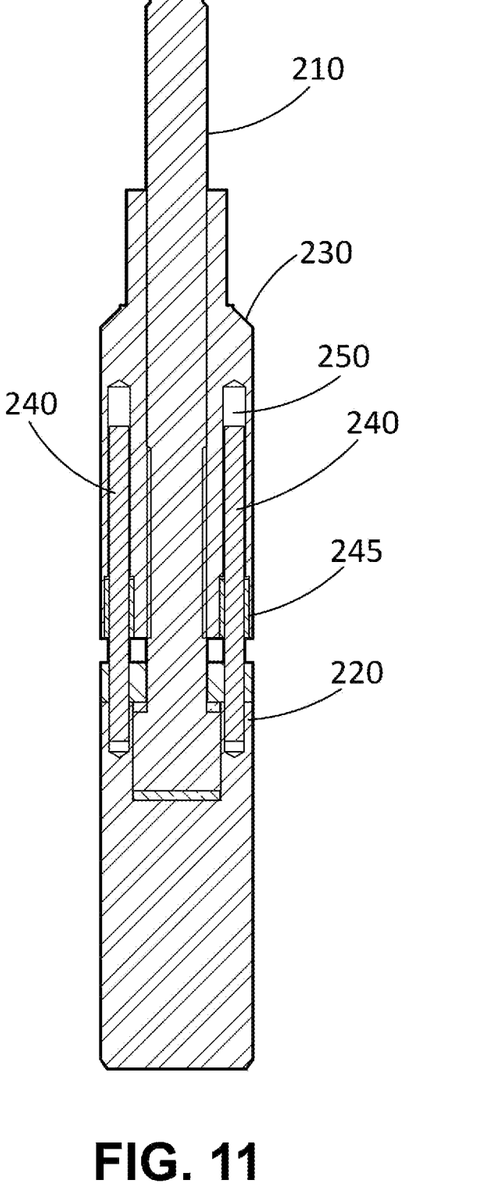
FIG. 11 is a further sectional view of the aft plate removal tool of FIG. 9.

FIGS. 9-11 show a further embodiment of the aft plate removal tool 100. In this example, an outer aft plate removal tool 200 is shown. As the name implies, the outer aft plate removal tool 200 is used from outside the combustor 25 to remove the aft plate 78 and the inner cap assembly 94. The outer aft plate removal tool 200 may be used with the fuel nozzle assembly 95 of FIG. 5 once the central liquid fuel nozzle 96 has been removed.

The outer aft plate removal tool 200 may include a central screw 210. A lower housing 220 and an upper housing 230 may be mounted on the central screw 210. The central screw 210 may be fixed within the lower housing 220. The lower housing 220 also may have a pair of slide rods 240 fixed therein. Each slide rod 240 may have a slide rod bearing 245 thereon. The upper housing 230 may be rotatably mounted onto the central screw 210. The upper housing 230 also may have a complementary slide rod bore 250 formed therein. The upper housing 230 may be rotatable with respect to the lower housing 220 along the central screw 210 and the slide rods 240.

The lower housing 220 may have a pair of lower feet 260 attached thereto. Each of the pair of lower feet 260 may be attached to the lower housing 220 by a lower pin 270. Each of the pair of lower feet 260 may be spring loaded via a lower spring 280. The lower feet 260 may be rotatable via the lower springs 280. Likewise, the upper housing 230 may have a pair of upper feet 290 attached thereto. Each of the pair of upper feet 290 may be attached to the upper housing 230 by an upper pin 300. Each of the pair of upper feet 290 may be spring loaded via an upper spring 310. The upper feet 290 may be rotatable via the upper springs 310. Each of the upper feet 290 may have an upper foot pad 320 thereon. The upper foot pads 320 may be made out of Delrin (polyoxymethylene) or similar materials to protect against frictional contact with the aft plate 78. The lower feet 260 and the upper feet 290 may be retracted within the housings 220, 230 via a set screw 330 and the like. Other components and other configurations may be used herein.

In use, the lower feet 260 and the upper feet 290 may be retracted via the set screw 330. The outer aft plate removal tool 200 may be inserted within the center passage 86 of the aft plate 78 and the inner cap assembly 94. Once clear of the aft plate 78, the lower feet 260 and the upper feet 290 may be extended. The lower feet 260 may be positioned about the downstream plate 74 and the upper feet 290 may be positioned beneath the aft plate 78. The upper housing 230 may be rotated and may move upward against the aft plate 78. As the upper housing 230 advances in contact with the aft plate 78, the upper feet 290 may flatten any deformation in the aft plate 78. As the aft plate 78 flattens, the aft plate 78 and the inner cap assembly 94 begin to separate from the micromixer tubes 92. The upper housing 230 and the upper feet 290 continue to advance until the aft plate 78 and the inner cap assembly 94 is completely pushed off of the micromixer tubes 92.

The advance of the upper housing 230 thus allows the aft plate 78 and the inner cap assembly 94 to slide freely off of the micromixer tubes 92. The aft plate 78 and the outer aft plate removal tool 200 then may be withdrawn from the combustor 25. The outer aft plate removal tool 200 thus provides the safe removal of the aft plate 78 and the inner cap assembly 94 from the micromixer tubes 92 in a fast and efficient manner.

It should be apparent that the foregoing relates only to certain embodiments of the present application and resultant patent. Numerous changes and modifications may be made herein by one of ordinary skill in the art without departing from the general spirit and scope of the invention as defined by the following claims and the equivalents thereof.

Further aspects of the invention are provided by the subject matter of the following clauses:

1. An aft plate removal tool for servicing a combustor, the combustor comprising an aft plate with a central passage and a plurality of tubes extending through the aft plate; the aft plate removal tool comprising: a central screw; a lower housing attached to the central screw, the lower housing comprising a plurality of spring loaded lower housing feet; and an upper housing attached to the center screw, the upper housing comprising a plurality of spring loaded upper housing feet; wherein the aft plate removal tool is inserted through the central passage of the aft plate; and wherein rotation of the upper housing advances the plurality of spring loaded upper housing feet against the aft plate until the plurality of spring loaded upper housing feet push the aft plate off of the plurality of tubes.

2. The aft plate removal tool of any preceding clause, wherein the central screw is fixed within the lower housing.

3. The aft plate removal tool of any preceding clause, wherein the upper housing rotates about the central screw.

4. The aft plate removal tool of any preceding clause, wherein the plurality of spring loaded upper housing feet comprises pads thereon.

5. The aft plate removal tool of any preceding clause, wherein the pads comprise a polyoxymethylene material.

6. The aft plate removal tool of any preceding clause, wherein the lower housing comprises a slide rod fixed therein and wherein the upper housing rotates about the slide rod.

7. The aft plate removal tool of any preceding clause, wherein the slide rod comprises a bearing thereon.

8. The aft plate removal tool of any preceding clause, wherein the plurality of spring loaded lower housing feet comprises a pair of spring loaded lower housing feet and wherein the plurality of spring loaded upper housing feet comprises a pair of spring loaded upper housing feet.

9. A method of removing an aft plate from a plurality of tubes of a combustor, comprising: inserting an aft plate removal tool through the aft plate; releasing a plurality of feet of the aft plate removal tool; rotating an upper housing of the aft plate removal tool to advance a number of the plurality of feet into contact with the aft plate; rotating further the upper housing to deform the aft plate; and rotating further the upper housing to push the aft plate off of the plurality of tubes.

10. The method of any preceding clause, wherein the aft plate removal tool is inserted through a central passage of the aft plate.

11. The method of any preceding clause, wherein a lower housing and the upper housing are attached to a central screw.

12. The method of any preceding clause, wherein the central screw is fixed within the lower housing.

13. The method of any preceding clause, wherein the upper housing rotates about the central screw.

14. The method of any preceding clause, wherein the plurality of feet comprises a plurality of spring loaded feet.

15. The method of any preceding clause, wherein the plurality of feet comprises a pair of upper housing feet and a pair of lower housing feet.

16. The method of any preceding clause, wherein the pair of upper housing feet comprises pads thereon.

17. The method of any preceding clause, wherein the pads comprise a polyoxymethylene material.

18. The method of any preceding clause, wherein the lower housing comprises a slide rod fixed therein and wherein the upper housing rotates about the slide rod.

19. The method of any preceding clause, wherein the slide rod comprises a bearing thereon.

We claim:

1. An aft plate removal tool for servicing a combustor, the combustor comprising an aft plate with a central passage and a plurality of tubes extending through the aft plate; the aft plate removal tool comprising:
    a central screw;
    a lower housing attached to the central screw, the lower housing comprising a plurality of spring loaded lower housing feet; and
    an upper housing attached to the center screw, the upper housing comprising a plurality of spring loaded upper housing feet;
    wherein the aft plate removal tool is inserted through the central passage of the aft plate; and
    wherein rotation of the upper housing advances the plurality of spring loaded upper housing feet against the aft plate until the plurality of spring loaded upper housing feet push the aft plate off of the plurality of tubes.

2. The aft plate removal tool of claim 1, wherein the central screw is fixed within the lower housing.

3. The aft plate removal tool of claim 1, wherein the upper housing rotates about the central screw.

4. The aft plate removal tool of claim 1, wherein the plurality of spring loaded upper housing feet comprises pads thereon.

5. The aft plate removal tool of claim 4, wherein the pads comprise a polyoxymethylene material.

6. The aft plate removal tool of claim 1, wherein the lower housing comprises a slide rod fixed therein and wherein the upper housing rotates about the slide rod.

7. The aft plate removal tool of claim 6, wherein the slide rod comprises a bearing thereon.

8. The aft plate removal tool of claim 1, wherein the plurality of spring loaded lower housing feet comprises a pair of the spring loaded lower housing feet and wherein the plurality of spring loaded upper housing feet comprises a pair of the spring loaded upper housing feet.

* * * * *